United States Patent
Ito

[11] Patent Number: 5,923,448
[45] Date of Patent: Jul. 13, 1999

[54] INPUT/OUTPUT UNIT

[76] Inventor: Toshinobu Ito, 216-3 Kaisei-Machi Ushijima, Ashigarakami-Gun, Kanagawa, Japan

[21] Appl. No.: 08/815,736

[22] Filed: Mar. 12, 1997

[30] Foreign Application Priority Data

Mar. 19, 1996 [JP] Japan ...................................... 8-062551

[51] Int. Cl.$^6$ ...................................................... G02F 1/00
[52] U.S. Cl. ........................... 359/109; 359/113; 359/153; 359/158; 359/168; 250/551
[58] Field of Search ...................................... 359/109, 117, 359/124, 128, 152, 158, 168, 113, 153; 250/551

[56] References Cited

U.S. PATENT DOCUMENTS

| | | | |
|---|---|---|---|
| 4,292,551 | 9/1981 | Kolmann | 359/109 |
| 4,847,873 | 7/1989 | Kuwaoka et al. | 359/158 |
| 4,961,205 | 10/1990 | Kuwaoka | 359/158 |
| 5,255,111 | 10/1993 | Kwa | 359/113 |
| 5,361,157 | 11/1994 | Ishikawa et al. | 359/168 |
| 5,408,350 | 4/1995 | Perrier et al. | 359/168 |
| 5,434,694 | 7/1995 | Saito et al. | 250/551 |
| 5,530,653 | 6/1996 | Chung et al. | 250/551 |
| 5,579,144 | 11/1996 | Whitney | 359/153 |

*Primary Examiner*—Jeffery A. Hofsass
*Assistant Examiner*—John Tweel, Jr.
*Attorney, Agent, or Firm*—Koda & Androlia

[57] ABSTRACT

When a selection signal of a low signal is applied to a first port, a second port becomes either a low or a high signal in accordance with an input signal being a low or a high signal at a third port and the third port can be used as an input port. Further, when a completely synchronized low or high signal is inputted to the first port and the second port, a signal of either a low or a high signal inputted to the second port can be outputted from the third port as it is and the third port can be used as an output port.

3 Claims, 2 Drawing Sheets

Fig.3

| INPUT | | OUTPUT | case |
|---|---|---|---|
| DA | P | DB | |
| H | L | L | I |
| H | H | H | II |
| L | L | L | V |
| L | H | L | VI |

Fig.4

| INPUT | | OUTPUT | case |
|---|---|---|---|
| DA | DB | P | |
| L | L | L | III |
| L | H | L | IV |
| H | L | H | VII |
| H | H | H | VIII |

INPUT/OUTPUT UNIT

BACKGROUND OF THE INVENTION

1. Field of the Invention

The present invention relates to an input/output unit which can be used as both of an input unit and an output unit of a control unit such as a computer.

2. Prior Art

In a recent electronic apparatus, a computer is used to control of various machines and detection of data. For example, the computer is used for control of a motor or a solenoid-controlled valve, detection of a rotational speed of a motor, detection of a flow rate of fluid adjusted by a solenoid-controlled valve or detection of temperature data. These types of control are performed by supplying a signal to a motor drive circuit, a solenoid-controlled valve circuit or the like.

Generally, in order to control the various general-purpose machines by means of a computer, the various machines and the computer are connected by cables or the like. An output unit and an input unit are connected between the various machines and the computer.

Control devices such as sensors, switches and the like are provided in the various machines to be controlled. Information from detection devices is inputted through the input unit to the computer. Further, various commands are transmitted from the computer through the output unit to the control devices.

In the prior art method as described above, however, there are problems as follows:

A first problem is that the output unit and the input unit are exclusive units for output and input, respectively, and accordingly two kinds of units are required separately.

A second problem is as follows: For example, when the number of output signals from the computer is larger than the number of input signals to the computer, many output units are required. On the other hand, a plurality of input ports provided in the input unit include useless ports. Thus, the conventional output unit and input unit include useless-ports depending on kinds of the control machines.

A third problem concerns shielding for noise. More particularly, various apparatuses often produce noise. The noise produced by the appartuses are transmitted through cables and input units to the computer. The computer sometimes fails to operate in the normal manner due to the noise.

In order to shield the computer from the noise to input signal lines or from output signal lines, a complicated filter circuit adapted to noise is required and is relatively expensive.

SUMMARY OF THE INVENTION

It is an object of the present invention to provide an input/output unit in which one port can be changed to be used as an input port or an output port in accordance with a selection signal to thereby utilize the port effectively.

Further, it is another object of the present invention to provide an input/output unit in which input signals and output signals are electrically insulated and noise is prevented from being transmitted to a computer directly to thereby make it difficult to cause malfunction in the computer.

In the input/output unit of the present invention, by applying a selection signal or a reset signal to a first port, a third port can be used as an input port or an output port. That is, when a second port is selected as the input port, the third port can be used as the output port, whereas when the third port is selected as the input port, the second port can be used as the output port. Accordingly, when a plurality of input/output units are provided, each of the input/output units can be used for inputting or outputting selectively. Thus, since the number of input and output ports corresponding to the number of machine apparatuses, sensors or switches to be controlled can be treated freely, there is no useless port.

Further, the input port and the output port can be connected optically by means of photocouplers or the like to thereby be insulated electrically. Accordingly, the noise shielding capability between the input signal and the output signal can be increased.

BRIEF DESCRIPTION OF THE DRAWINGS

FIG. 3 is a truth table in case where a third port (P) is used as an input port; and FIG. 4 is a truth table in case when the third port (P) is used as an output port.

DETAILED DESCRIPTION OF THE PREFERRED EMBODIMENT

Figure 1:
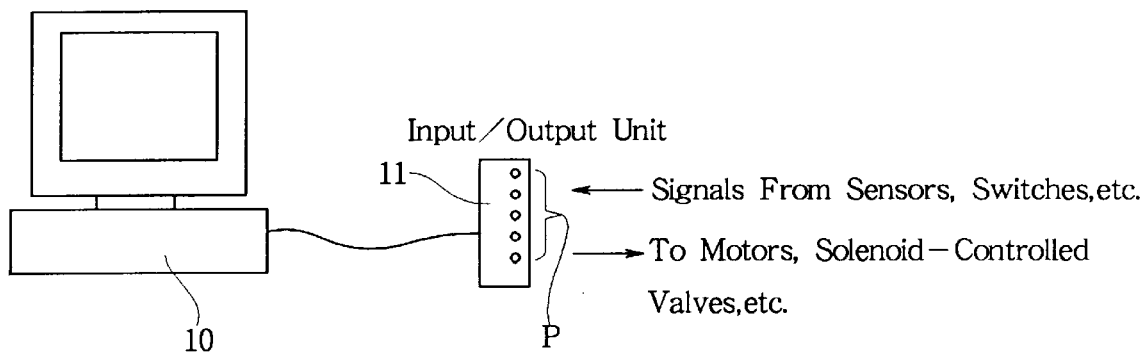
FIG. 1 schematically illustrates a computer body and an input/output unit according to the present invention connected to each other.

Referring now to FIG. 1, an input/output unit (11) is connected to a computer body (10).

The input/output unit (11) is provided with a plurality of third ports (P). The third ports (P) are each connected to various machines to be controlled. For example, the machines include a motor drive circuit, a control circuit of a solenoid controlled valve, other control circuit, various sensors or switches provided in the various machines and the like. Detection signals based on various operations are supplied from sensors and the like of the various machines to be controlled through the input/output unit (11) to the computer (10). Further, commands from the computer (10) are transmitted through the input/output unit (11) to the various machines.

Figure 2:
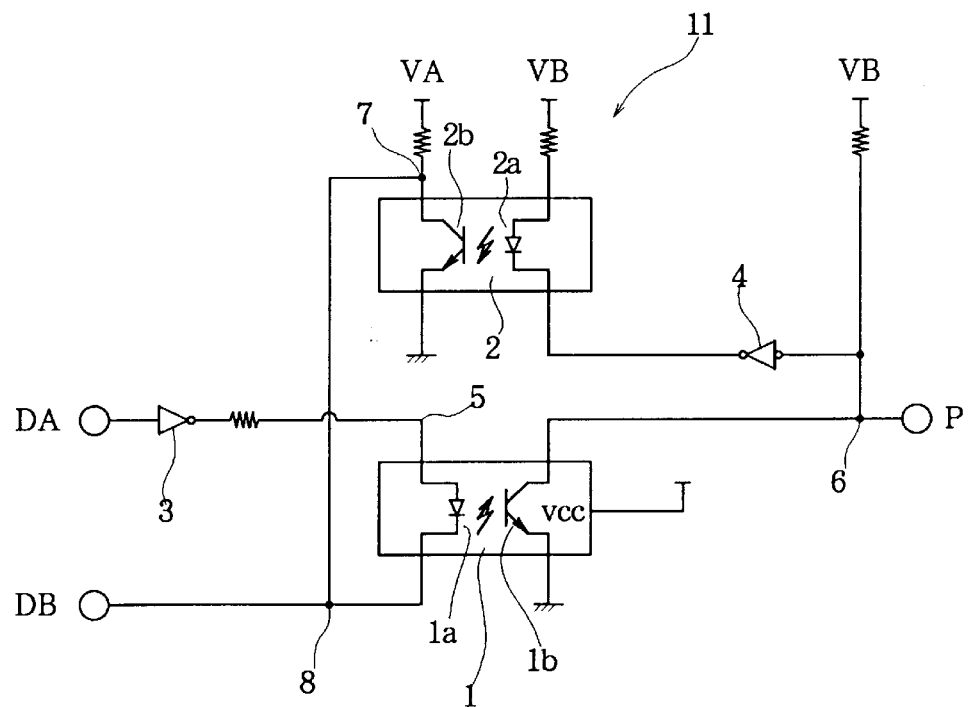
FIG. 2 is a circuit diagram of an input/output unit according to the present invention.

As shown in FIG. 2, the input/output unit (11) is mainly composed of a first photocoupler (1) and a second photocoupler (2). The first photocoupler (1) includes a pair of light emitting element and light receiving element. In general, a light emitting diode (1a) is used as the light emitting element and a phototransistor (1b) is used as the light receiving element. The light emitting diode (1a) and the phototransistor (1b) are accommodated into one package. The light emitting diode (1a) and the phototransistor (1b) are disposed in opposing relationship with each other in the package. Similarly, the second photocoupler (2) also includes a light emitting diode (2a) and a phototransistor (2b) disposed in opposing relationship with each other in a package. In the first and second photocouplers (1) and (2), when a current flows from an anode to a cathode of the light emitting diode, the light emitting diode emits light. At this time, in the package, light emitted by the light emitting diode is received by the phototransistor. Consequently, a current flows from a collector to an emitter of the phototransistor.

In the input/output unit (11), for example, PS9634 is used as the first photocoupler (1), TLP521-4 as the second photocoupler (2), SN74LS540 as a NOT circuit (3) and TC4050BP as a buffer circuit (4).

A third port (P) can function as an I/O (input/output) port using a second port (DB) as an address. A first port (DA) is an input port of an I/O selection signal or a reset signal. A signal from the first port (DA) is inverted by the NOT circuit (3). Further, the buffer circuit (4) is connected between the third port (P) and the light emitting diode (2a). Reference marks (VA) and (VB) represent a primary power supply and a secondary power supply, respectively. The power supply (VA) produces a voltage of +5 volts and the power supply (VB) produces a voltage of +12 volts, for example.

A connection structure of the above portions and the photocouplers is described in order.

A first port (DA) is connected through the NOT circuit (3) to the anode of the light emitting diode (1a) of the first photocoupler (1) so that a signal from the first port is inverted by the NOT circuit to be supplied to the anode of the light emitting diode (1a). The second port. (DB) is connected to the cathode of the light emitting diode (1a). The third port (P) is connected to the collector of the phototransistor (1b) of the first photocoupler (1). Further, the emitter of the phototransistor (1b) is connected to ground. The primary power supply (VA) is connected to the cathode (point 8) of the light emitting diode (1a) of the first photocoupler (1) and the collector (point 7) of the phototransistor (2b) of the second photocoupler (2).

On the other hand, in the second photocoupler (2), the cathode of the light emitting diode (2a) is connected through the buffer circuit (4) to the third port (P). The collector of the phototransistor (2b) is connected to the second port (DB) and the emitter thereof is connected to ground. The secondary power supply (VB) is connected to the third port (P), the cathode of the light emitting diode (2a) of the second photocoupler (2), the buffer circuit (4) and the collector of the phototransistor (1b) of the first photocoupler (1).

In the following description, voltages at portions of the input/output unit are represented by (H) and (L). (H) means a high level of a predetermined potential (for example, +5 volts or +12 volts) and (L) means a low level of a ground potential (0 volt). Various points in the circuit are represented by points (5), (6), (7) and (8). Truth tables of FIGS. 3 and 4 show circuit conditions from cases I to VIII described below.

Operation of the input/output unit is now described.
(When the selection signal (H) is applied to the first port (DA))

When the first port (DA) is (H), the point (5) to which the inverted output of the NOT circuit (3) is supplied is (L). Accordingly, since no current flows in the light emitting diode (1a) of the first photocoupler (1), the light emitting diode (1a) does not emit light and is left to be OFF. Further, the phototransistor (1b) is in the state where light is not received and no current flows in the phototransistor (1b).

(Case I)

At this time, when (L) is inputted to the third port (P) so that the point (6) is set to (L), a electric potential difference occurs between the secondary power supply (VB) and the point (6). Accordingly, since a current flows in the light emitting diode (2a) of the second photocoupler (2), the light emitting diode (2a) is turned ON. Thus, since a current flows in the phototransistor (2b) which has received light from the light emitting diode (2a), the point (7) is changed to the ground potential of (L). Accordingly, the point (8) is (L) and the second port (DB) is (L).

(Case II)

Conversely to the case I, (H) is inputted to the third port (P) so that the point (6) is set to (H). In this case, since a current does not flow in the light emitting diode (2a) of the photocoupler (2) (OFF), the phototransistor (2b) is changed to the state where light is not received and a current does not flow in the phototransistor (2b). Thus, the point (7) is (H). Accordingly, the point (8) is (H) and the second port (DB) is (H).

As described in the cases I and II, when the selection signal (H) is inputted to the first port (DA) and latched thereto, the third port (P) functions as the input port and the second port (DB) functions as the output port. That is, the digital input signal supplied to the third port (P) is outputted from the second port (DB) as it is. Accordingly, when the second port (DB) is connected to, for example, a part of a bus of a computer, the input signal from an external apparatus to the third port (P) can be applied through the bus to the computer directly.

(When a selection signal (L) is applied to the first port (DA))
(Case III)

When the first port (DA) is (L), the point (5) is (H). At this time, when (L) is inputted to the second port (DB) so that the point (8) is set to (L), a current flows in the light emitting diode (1a) of the first photocoupler (1), so that the light emitting diode (1a) is turned ON to emit light. Consequently, since the phototransistor (1b) is changed to the light receiving state and a current flows in the phototransistor (1b), the third port (P) is changed to (L). Further, a current also flows in the light emitting diode (2a) of the second photocoupler (2) and the light emitting diode (2a) emits light to be turned ON. Accordingly, the phototransistor (2b) becomes the light receiving state and a current flows therein, so that the point (7) is changed to (L), that is, the ground potential.

(Case IV)

In the state of the case III, when the second port (DB) is inverted to (H), the points (7) and (8) are connected through the phototransistor (2b) to the ground potential since a current already flows in the phototransistor (2b). Accordingly, since the point (8) is maintained to be (L), the light emitting diode (1a) continuously emits light and the point (6) and the third port (P) are left (L). In other words, even when (H) is inputted to the second port (DB) after (L) has been once inputted to the second port (DB) as far as the first port (DA) is (L), the third port (P) is maintained to (L).

(Case V)

Conversely, the case where (L) is applied to the third port (P) so that the point (6) is set to (L) in the case where the first port (DA) is (L) also comes to the same thing. In other words, the light emitting diode (2a) emits light to be turned ON, so that the phototransistor (2b) is changed to the light receiving state to thereby conduct a current through the phototransistor (2b) and the point (7) becomes (L). Thus, the point (8) and the second port (DB) are (L). Accordingly, the light emitting diode (1a) continuously emits light. Thus, the phototransistor (1b) becomes the light receiving state and a current continuously flows through the phototransistor (1b).

(Case VI)

In this state, even when the input of the third port (P) is inverted to (H), a current continuously flows in the phototransistor (1b). Accordingly, since the point (6) is maintained to (L) at the ground potential, the point (8) and the second port (DB) are maintained to (L) as they are. In other words, when (L) is once inputted to the third port (P), the second port (DB) is maintained to (L).

In the cases V and VI, when the selection signal (L) is applied to the first port (DA) and is latched thereto, the input/output unit shown in FIG. 1 becomes a latch type. At this time, when the second port (DB) is used as the input port, the third port (P) can be used as the output port of latch type. Further, conversely, when the third port (P) is used as the input port, the second port (DB) can be used as the output port of latch type.

(When a reset signal (H) is applied to the first port (DA))

(Case VII)

As in the above case III, when (L) is inputted to the second port (DB) in the case where the first port (DA) is (L), the third port (P) is maintained to (L). At this time, when the reset signal of (H) is applied to the first port (P), the output of the third port (P) can be inverted to (H).

In other words, in the case III (the first and second ports (DA) and (DB) are (L) and the light emitting diodes (1a) and (2a) are ON), when the reset signal (H) is applied to the first port (DA), the point (5) is changed to (L), so that the light emitting diode (1a) is turned OFF. Then, current does not flow in the phototransistor (1b), so that the point (6) and the third port (P) become (H). Accordingly, the light emitting diode (2a) is also turned OFF, so that the phototransistor (2b) is changed to the state where light is not received and the points (7) and (8) become (H).

(Case VIII)

Further, the case where the reset signal (H) is inputted to the first port (DA) in the case where the second port (DB) is (H) comes to the same thing. That is, since a current does not flow in the light emitting diode (1a), the phototransistor (1b) becomes the state where light is not received. Accordingly, the collector of the phototransistor (1b) becomes (H) and the third port (P) also becomes (H).

More particularly, as apparent from the cases VII and VIII, when the reset signal (H) is inputted to the first port (DA), the third port (P) can be set to (H) whether the second port (DB) is (L) or (H).

Thereafter, the reset of the first port (DA) is removed and (L) is inputted to the first port (DA) instead. At the same time, (L) is inputted to the second port (DB). As described above, the third port (P) is changed to (L) and further maintains to (L) (case III).

The foregoing is summarized as follows:

(When the third port (P) is used as the output port)

When the input signal is (L), (L) is applied to the first port (DA). Thus, when the input signal (L) is inputted to the second port (DB) as it is, (L) is outputted from the third port (P) as it is (case III).

Further, when the input signal is (H), the input signal (H) is applied to the port (DA) and the second port (DB) at the same time (case VIII) or (H) is applied to only the first port (DA) (case VII) to thereby be able to inverse the output of the third port (P) to (H). This can be easily realized by removing latch of a latch circuit which applies (L) to the first port (DA). For example, there may be provided a logic circuit which removes latch of the latch circuit when the input signal becomes (H) of a digital signal. By applying the reset signal (H) to the first port (DA) only when the input signal is (H), the ports (DA) and (DB) can be made to be the input port and the third port (P) can be made to be the output port of the digital signal.

(When the second port (DB) is used as the output port)

Further, when (L) is applied to the third port (P) as the input port in the case where the selection signal of (L) is applied to the first port (DA), the second port (DB) is maintained to (L) as described above (case V). Next, when the signal of (H) is applied to the first port (DA) as the reset signal in the case where the input signal to the third port (P) is (H), the light emitting diode (1a) is turned OFF and accordingly the point (6) is (H). Thus, the light emitting diode (2a) is turned OFF and the point (7) becomes (H), so that the second port (DB) becomes (H) (case II). Accordingly, the third port (P) and the second port (DB) are defined as the input port and the output port, respectively, and by applying the reset signal (H) to the first port (DA) only when the input signal is (H), the output signal can be derived from the second port (DB).

As described above, the input/output unit shown in FIG. 2 can be used as the I/O port of the computer body (10) shown in FIG. 1. More particularly, by applying the selection signal or the reset signal from the computer to the first port (DA), one port can be selected freely to be used as the first port (input port) or the output portion (output port). Accordingly, it is prevented that useless ports are left as in the case where exclusive or dedicated ports for only input and only output are provided.

As described above, the input/output unit of the present invention has the generality capable of being used not only as the input unit but also as the output unit by applying the selection signal or the reset signal from the computer body thereto. Further, since the input signal and the output signal are coupled optically, the noise shielding effect is increased.

I claim:

1. An input/output unit for inputting or outputting a signal, comprising:

a) a first photocoupler including a first light emitting element and a first light receiving element;

b) a second photocoupler including a second light emitting element and a second light receiving element;

c) first, second and third ports through which signals are inputted or outputted; and d) primary and secondary power supplies;

said first and second ports to which a selection signal or a reset signal is inputted being connected to said first light emitting element of said first photocoupler, said third port being connected to a side of said first light receiving element which is not connected to ground, sad third port being connected to said second light emitting element of said second photocoupler, said second port being connected to a side of said second light receiving element which is not connected to ground, a voltage of said primary power supply being applied to said side of said second light emitting element of said second photocoupler, a voltage of said secondary power supply being applied to said third port and said second light emitting element of said second photocoupler.

2. An input/output unit according to claim 1, wherein the selection signal is applied to said first port connected to an anode of said first light emitting element of said first photocoupler, so that said third and second ports function as input and output ports, respectively.

3. An input/output unit according to claim 1, wherein when any one of said second and third ports is used as an input port and the other is used as an output port, the reset signal is applied to said first port in accordance with change of an input signal at the same time when said input signal is applied to said input port.

* * * * *